United States Patent
Capps, Jr. et al.

(10) Patent No.: US 7,962,770 B2
(45) Date of Patent: Jun. 14, 2011

(54) DYNAMIC PROCESSOR RECONFIGURATION FOR LOW POWER WITHOUT REDUCING PERFORMANCE BASED ON WORKLOAD EXECUTION CHARACTERISTICS

(75) Inventors: Louis B. Capps, Jr., Georgetown, TX (US); Robert H. Bell, Jr., Austin, TX (US); Michael J. Shapiro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 11/960,163

(22) Filed: Dec. 19, 2007

(65) Prior Publication Data

US 2009/0164812 A1 Jun. 25, 2009

(51) Int. Cl.
*G06F 1/26* (2006.01)
(52) U.S. Cl. .................. 713/300; 713/324
(58) Field of Classification Search .......... 713/300, 713/324
See application file for complete search history.

(56) References Cited

U.S. PATENT DOCUMENTS

| | | | |
|---|---|---|---|
| 6,785,826 B1 * | 8/2004 | Durham et al. | 713/300 |
| 6,820,209 B1 * | 11/2004 | Culbert et al. | 713/501 |
| 6,931,559 B2 * | 8/2005 | Burns et al. | 713/340 |
| 7,167,989 B2 * | 1/2007 | Sperber et al. | 713/310 |
| 7,281,147 B2 * | 10/2007 | Soltis et al. | 713/322 |
| 7,747,844 B2 * | 6/2010 | McCormick et al. | 712/227 |
| 7,797,561 B1 * | 9/2010 | Abdalla et al. | 713/322 |
| 2007/0136617 A1 | 6/2007 | Kanno et al. | |

FOREIGN PATENT DOCUMENTS

| | | |
|---|---|---|
| WO | WO02074046 A2 | 9/2002 |
| WO | WO03058418 A2 | 7/2003 |

* cited by examiner

*Primary Examiner* — Nitin C Patel
(74) *Attorney, Agent, or Firm* — Hamilton & Terrile, LLP; Michael Rocco Cannatti

(57) ABSTRACT

A method, system and program are provided for dynamically reconfiguring a pipelined processor to operate with reduced power consumption without reducing existing performance. By monitoring or detecting the performance of individual units or stages in the processor as they execute a given workload, each stage may use high-performance circuitry until such time as a drop in the throughput performance is detected, at which point the stages are reconfigured to use lower-performance circuitry so as to meet the reduced performance throughput requirements using less power. By configuring the processor to back off from high-performance designs to low-performance designs to meet the detected performance characteristics of the executing workload warrant, power dissipation may be optimized.

20 Claims, 4 Drawing Sheets

DYNAMIC PROCESSOR RECONFIGURATION FOR LOW POWER WITHOUT REDUCING PERFORMANCE BASED ON WORKLOAD EXECUTION CHARACTERISTICS

BACKGROUND OF THE INVENTION

1. Field of the Invention

The present invention is directed in general to the field of data processing systems. In one aspect, the present invention relates to dynamic power control in pipelined processor systems.

2. Description of the Related Art

In pipelined processor designs, individual pipeline stages are typically designed to provide maximum performance by minimizing latencies to and from memory and maximizing bandwidths at each stage. However, such processors are often "over-designed" because typical processor usage does not require that all of the stages perform maximally in every clock cycle. Where processors are designed to execute maximally whenever possible, their operation can cause substantial power dissipation and can actually lead to decreased performance for some instruction distributions. For example, when executing a workload having a naturally low instruction-level parallelization (ILP), a processor pipeline need not operate in a full power/high-throughput mode, and indeed, such a mode of operation may negatively impact performance due to higher latencies in the units and cost power unnecessarily. Accordingly, there is a need for a system and method for controlling the performance and power dissipation in a pipelined processor system. In addition, there is a need for a pipelined processor system and design which provides the required level of performance and throughput without excessive power dissipation. Further limitations and disadvantages of conventional solutions will become apparent to one of skill in the art after reviewing the remainder of the present application with reference to the drawings and detailed description which follow.

SUMMARY OF THE INVENTION

In accordance with various embodiments of the present invention, a processor design and methodology are set forth in which a dynamically configurable processor monitors or detects the performance of individual units or stages in the processor as they execute a given workload. The dynamically configurable processor includes one or more stages which have a high-performance design/mode and a low-performance design/mode. The high-performance design/mode is used to execute the workload at a relatively high power dissipation level, but when warranted by the detected performance characteristics of the executing workload, the processor switches to use the low-performance design/mode to execute the workload at a relatively lower power dissipation level. By configuring the processor to back off from high-performance designs to low-performance designs to meet the detected performance characteristics of the executing workload warrant, power dissipation may be optimized. In selected embodiments, the throughputs of individual pipeline stages (e.g., fetch, decode, execute, write-back, completion) are monitored during a defined window of time, such as by counting the number of stage operations during the time window. Initially, the individual pipeline stages use a high-throughput, high power design. However, if the throughput count for any stage indicates that there is a performance bottleneck at that stage, the processor pipeline is dynamically reconfigured to use lower-throughput, lower power design.

In accordance with various embodiments, one or more individual pipeline stages may be dynamically configured to switch between a high-throughput, high power design and a lower-throughput, lower power design under software control using the methodologies and/or apparatuses described herein, which may be implemented in a data processing system with computer program code comprising computer executable instructions. In whatever form implemented, the power dissipation in a pipelined processor may be controlled by measuring throughput rates for a plurality of pipeline stages operating in a high-performance mode. In an example implementation, the throughput rates are measured by counting, for each pipeline stage, how many stage events occur during a predetermined window. By measuring the throughput rates over time, any drop-off in the rates can be detected, such as by comparing one or more of the throughput rates to a predetermined high-performance throughput threshold value. Upon detecting when one or more of the plurality of throughput rates are reduced to a first predetermined throughput rate, a first power level control signal is sent to the plurality of pipeline stages. In various embodiments, the power control signal may be broadcast as a one-bit power level control signal to all of the pipeline stages, or may be sent as separate power level control signals to each of the pipeline stages. If the stage has multiple levels of operation with various throughput and power rates, a plurality of power level control signals may be implemented to choose between the levels of operation. In response to the first power level control signal, each pipeline stage is reconfigured to operate in a low-performance mode, thereby reducing power dissipation by the plurality of pipeline stages. The reconfiguration into a low-performance mode may be implemented by selecting, at each stage, a first low-power circuit in response to the first power level control signal. To return to the high-performance mode, the throughput rates for the plurality of pipeline stages now operating in the low-performance mode are monitored to detect when the throughput rates meet or exceed a second predetermined threshold rate over a window of clock cycles, at which point a second power level control signal is sent to the pipeline stages so that each pipeline stage is reconfigured to operate in a high-performance mode.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

A method, system and program are disclosed for monitoring the performance of a pipelined processor to reconfigure the pipeline to switch from a high-performance (high power) mode to a low-performance (low-power) mode upon detecting a decrease in processor throughput. By designing units to have multiple modes of operation, and employing a scheme to switch between the modes by sensing the throughput or ILP characteristics of the executing workloads, the power-dissipation may be reduced along with execution latency per cycle, such that performance does not necessarily worsen and may actually improve. In selected embodiments, a performance monitor orchestrates how each pipeline stage is configured to operate so that a high-performance configuration is used to execute the workload at a relatively high power dissipation level, but a low-performance configuration is used to execute the workload at a relatively lower power dissipation level when warranted by the detected performance characteristics of the executing workload.

Various illustrative embodiments of the present invention will now be described in detail with reference to the accompanying figures. It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block diagram block or blocks. In addition, while various details are set forth in the following description, it will be appreciated that the present invention may be practiced without these specific details, and that numerous implementation-specific decisions may be made to the invention described herein to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 1:
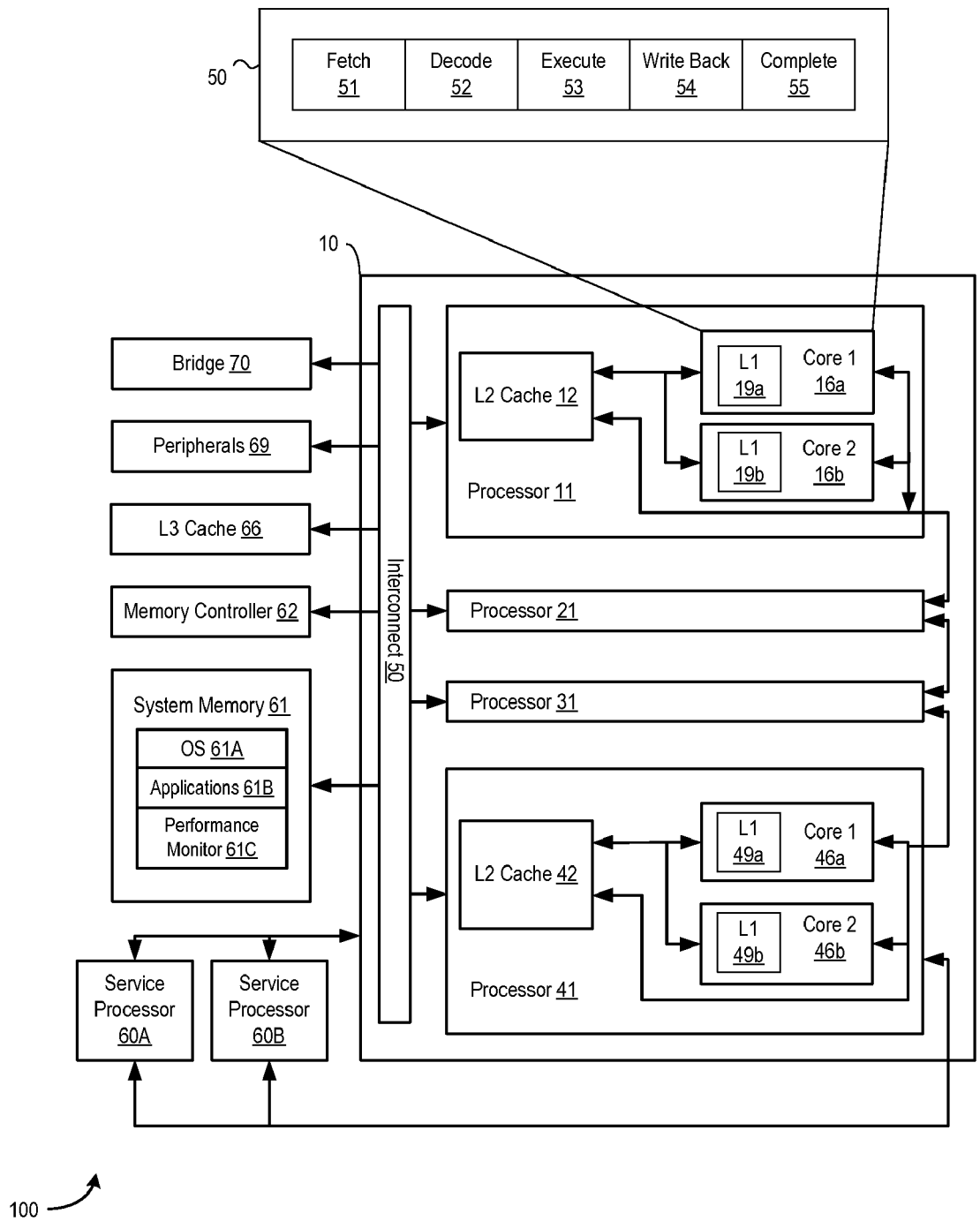
FIG. 1 illustrates a multi-processor computer architecture in which selected embodiments of the present invention may be implemented.

Referring now to FIG. 1, there is illustrated a high-level block diagram of a multiprocessor (MP) data processing system 100 that provides low power execution of program workloads without reducing performance s in accordance with selected embodiments of the present invention. The data processing system 100 has one or more processing units arranged in one or more processor groups, and as depicted, includes four processing units 11, 21, 31, 41 in processor group 10. In a symmetric multi-processor (SMP) embodiment, all of the processing units 11, 21, 31, 41 are generally identical, that is, they all use a common set or subset of instructions and protocols to operate, and generally have the same architecture. As shown with processing unit 11, each processing unit may include one or more processor cores 16a, 16b which carry out program instructions in order to operate the computer. An exemplary processing unit would be the POWER5™ processor marketed by International Business Machines Corp. which comprises a single integrated circuit superscalar microprocessor having various execution units, registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture.

As further depicted in FIG. 1, each processor core 16a, 16b includes an on-board (L1) cache memory 19a, 19b (typically, separate instruction and data caches) that is constructed from high speed memory devices. Caches are commonly used to temporarily store values that might be repeatedly accessed by a processor, in order to speed up processing by avoiding the longer step of loading the values from system memory 61. A processing unit can include another cache such as a second level (L2) cache 12 which, along with a cache memory controller (not shown), supports both of the L1 caches 19a, 19b that are respectively part of cores 16a and 16b. Additional cache levels may be provided, such as an L3 cache 66 which is accessible via fabric bus 50. Each cache level, from highest (L1) to lowest (L3) can successively store more information, but at a longer access penalty. For example, the on-board L1 caches (e.g., 19a) in the processor cores (e.g., 16a) might have a storage capacity of 128 kilobytes of memory, L2 cache 12 might have a storage capacity of 4 megabytes, and L3 cache 66 might have a storage capacity of 132 megabytes. To facilitate repair/replacement of defective processing unit components, each processing unit 11, 21, 31, 41 may be constructed in the form of a replaceable circuit board, pluggable module, or similar field replaceable unit (FRU), which can be easily swapped, installed in, or swapped out of system 100 in a modular fashion.

The processing units communicate with other components of system 100 via a system interconnect or fabric bus 50. Fabric bus 50 is connected to one or more service processors 60, a system memory device 61, a memory controller 62, a shared or L3 system cache 66, and/or various peripheral devices 69. A processor bridge 70 can optionally be used to interconnect additional processor groups. Though not shown, it will be understood that the data processing system 100 may also include firmware which stores the system's basic input/output logic, and seeks out and loads an operating system from one of the peripherals whenever the computer system is first turned on (booted).

As depicted in FIG. 1, each core (e.g., 16a) in the data processing system 100 includes may be implemented as with a pipelined structure 50 in which a plurality of pipeline stages are provided so that each stage may simultaneously execute a task. In an example implementation, the pipelined structure 50 may include a fetch stage 51, a decode stage 52, an execution stage 53, a write-back stage 54 and a complete stage 55, where each stage may include one or more units. When operating as a pipeline, the fetch stage 51 retrieves one or more instructions in a given cycle, while during the same cycle, the decode stage 52 decodes an instruction that was fetched in a previous cycle. Simultaneously, the execute stage 53 calculates the results of one or more previously fetched and decoded instructions, the write-back stage 54 performs any register write-back operations required by the execution stage in the previous cycle, and the completion stage 55 maintains the correct architectural machine state by considering the previously executed instructions.

The system memory device 61 (random access memory or RAM) stores program instructions and operand data used by the processing units, in a volatile (temporary) state, including the operating system 61A and application programs 61B. In addition, a performance monitor module 61C may be stored in the system memory in any desired form, such as an operating system module or system supervisor, such as a hypervisor component, etc, and is used to optimize the power consumption of the processor core in response to detected performance or throughput conditions in the pipelined structure 50. Although illustrated as a facility within system memory, those skilled in the art will appreciate that performance monitor module 61C may alternatively be implemented within another component of data processing system 100, or individual instances of the performance monitor module may be implemented in each of the processing cores to separately control the power dissipation at each core. However implemented, the performance monitor module 61C may use executable instructions, code and/or control logic including programmable registers to check performance throughput for a given pipeline structure over some number (or window) of clock cycles (e.g., 5 events in 8 clock cycles), to detect any pipeline stage that is operating with lower throughput performance (e.g., from being stalled), and to select a low performance mode or circuit design in the affected pipeline stages which operates with lower power dissipation while maintaining the existing performance level for the pipeline, as described more fully below.

Figure 2:
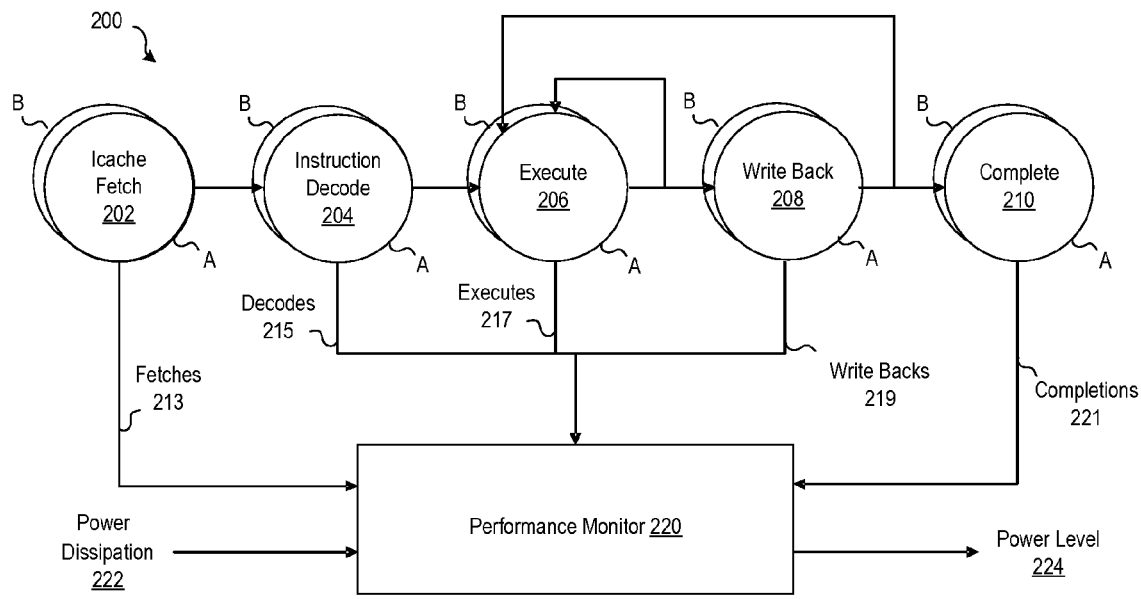
FIG. 2 illustrates in simplified schematic form a processor pipeline with performance monitor logic that counts events in a defined window of a number of cycles.

In various embodiments, the performance monitor module may be used to monitor and control the performance level of individual pipeline stages in a processor core so as to trade-off throughput (or bandwidth) with latency and power. An example embodiment is depicted in FIG. 2, which illustrates in simplified schematic form an example processor pipeline 200 having a performance monitor logic 220 that monitors the throughput for each pipeline stage, and then controls the power consumption of individual pipeline stages based on the detected throughput of individual stages. Any desired pipeline architecture may be used that includes a plurality of stages. For example, the pipeline 200 may include an instruction cache fetch stage 202 that fetches and forwards instructions, an instruction decode stage 204 that decodes fetched instructions, an execution stage 206 that executes decoded instructions based on execution and write-back feedback, a write-back stage 208 that performs write-back operations to the register files, and a completion stage 210 which completes the instructions. As indicated in FIG. 2, each of the fetch, decode, execution issue, write-back, and completion stages of the processor pipeline 200 have multiple modes of operation and/or separately selectable circuitry or logic. For example, pipeline 200 may include a fetch stage 202 having at least two modes, such as (1) a high-power, high-throughput mode that can fetch 4 instructions per cycle over 2 cycles pipelined, and (2) a low-power, low-throughput mode that can fetch 2 instructions per cycle over 1 cycle pipelined. The high-power, high-throughput fetch mode may be implemented with a first fetch circuit 202A, while the low-power, low-throughput mode may be implemented with a second fetch circuit 202B. In addition, the decode stage 204 could have two or more separately selectable decode circuits, such as (1) a first decode circuit 204A that decodes 4 instructions over 3 cycles pipelined, and (2) a second decode circuit 204B that decodes 2 instructions over 1 cycle pipelined. In similar fashion, separately selectable circuitry, modes and/or logic may be provided at the execution stage 206 for executing instructions, such as (1) a first execution circuit 206A running at twice the clock frequency of the decode unit that executes an instruction in 2 cycles, and (2) a second execution circuit 206B running at the same clock frequency as the decode unit that executes an instruction in 4 cycles. Similarly, separately selectable circuitry, modes and/or logic may be provided to the write-back stage 208 to handle various numbers and latencies of write-backs to the register file, and at the completion stage 210 to handle various numbers and latencies of completing instructions. In each of the depicted stages, the high-power, high-throughput circuit or mode is indicated with the "A" suffix, while the low-power, low-throughput circuit or mode is indicated with the "B" suffix.

As depicted in FIG. 2, each of the pipeline stages 202, 204, 206, 208, 210 has logic and/or circuitry which monitors the performance of each of the pipeline stages by detecting a throughput count per cycle that is sent to performance monitor logic 220. Thus, the instruction cache fetch stage 202 counts the number of instructions that are fetched per cycle and forwarded to the instruction decode stage 204, and provides the fetch count 213 to the performance monitor 220. Likewise, the instruction decode stage 204 counts decode events per cycle and sends the decode count 215 to the performance monitor 220, while the execution stage 206 counts execution events per cycle and provides an execution count 217 to the performance monitor 220. In similar fashion, the write-back stage 208 sends a write-back count 219 for the number of write-back operations which are forwarded to the completion stage 210, while the completion stage 210 counts the number of completions performed and provides the completion count 221 to the performance monitor 220. Also shown is a power dissipation signal 222 which may be generated by a thermal sensor and indicates the current power dissipation state of the system. Signal 222 may comprise a plurality of signals originating from different parts of the system.

Figure 3:
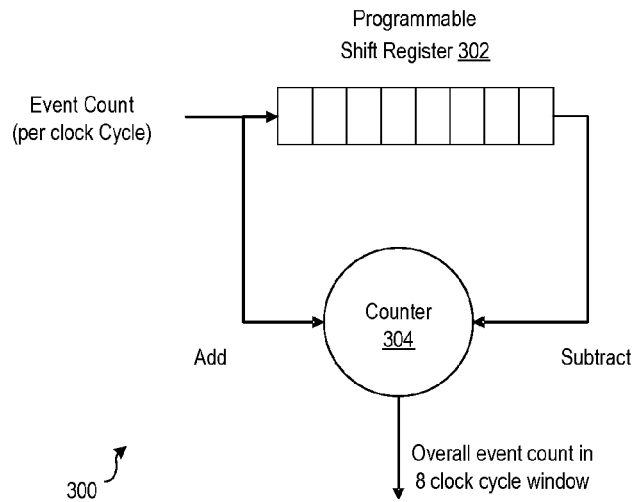
FIG. 3 illustrates in simplified form a counter for counting events in a programmable window of cycles.

While any desired technique may be used to monitor the pipeline performance, selected embodiments of the present invention monitor the performance of individual stages by counting the number of operations for each stage during a counting window. An example implementation is depicted in FIG. 3, which illustrates in simplified form a throughput counter 300 that is provided for each stage to count the number of events that occurred at the stage during a programmable window of cycles. While any desired window for counting may be used, the depicted throughput counter 300 counts stage events over an 8-cycle window by using an 8 cycle shift register 302. The programmable shift register 302 is provided to receive an event count indication from the stage, where each event count indication is added to the value maintained by counter 304. The counter 304 is further coupled to the output of the programmable shift register 302 so that the event count that is shifted out of register 302 is subtracted from counter 304. In operation, an event count that enters the shift register 302 in the leftmost register bit is shifted to the next register bit at every clock tick. With this arrangement, the counter 304 will output an event count equal to the number of stages times the maximum number of events that can occur in the stage each clock cycle when operating in a steady state, high performance mode. For example, if 4 events could occur each clock cycle and the register 302 is 8 stages long, then the maximum counter value could be "32". However, if the stage fails to generate any event during a clock cycle, the counter 304 will output a lower event count, thereby signaling a reduced performance throughput for that stage. In this way, the event count generated by the throughput counter 300 provides an indication of the performance level of the stage being monitored by the throughput counter 300.

Referring back to FIG. 2, the performance monitor 220 uses the throughput counts 213, 215, 217, 219, 221 to generate one or more signals to adjust the performance of the individual pipeline stages to match the performance level of the lowest performing stage. Thus, if the performance monitor 220 determines from the throughput counts that the back-end of the processor pipeline is stalled (e.g., waiting for outstanding load misses, branch mispredicts, and execution unit latencies), the performance of the front-end stages can be switched from a high-performance, high power consumption mode (which uses high-performance fetch circuitry 202A) to a lower-performance, low power consumption mode (which uses lower-performance fetch circuitry 202B). In such a case, the front-end fetch stage 202 could also use a lower-performance circuit 202B or mode to fetch fewer instructions one at a time with the same performance result for the overall pipeline 200 since the back-end of the pipeline is limiting the overall throughput. Likewise, if a front-end stage is stalled (e.g., the fetch stage 202 stalls on an instruction miss), it is not necessary that the subsequent decode stage 204 continue to use the high-performance, high power consumption decode circuit 204A to decode a maximum number of instructions in the same cycle for use further down in the processor pipeline since, after they are decoded, bubbles will appear in the pipe due to the fetch unit stall condition. By using a lower-performance decode circuit 204B to decode fewer instructions when there is no performance impact to doing so, power dissipation per cycle can be reduced. In similar fashion, the other back-end stages can be effectively powered down to match the performance level of the stalled front-end stage, thereby substantially reducing the power consumption of the overall pipeline.

In selected embodiments, the performance monitor 220 includes control logic for generating one or more power level signals 224 which are broadcast to all the stages. In effect, the control logic coalesces the throughput counts 213, 215, 217, 219, 221 (alone or in combination with a power dissipation signal 222 which quantifies the amount of power being consumed by the processor pipeline 200) into the power level signal(s) 224. The control logic in the performance monitor 220 may be configured to use the throughput counts to determine if a stage has a reduced throughput as compared to the other stages and to identify the pipeline stage which has the lowest throughput for the pipeline. When a low performing stage is detected, the control logic in the performance monitor 220 generates one or more power level signals 224 to control the performance of the individual stages to match the throughput of the lowest performing stage by selecting a lower power circuit or mode of operations for each stage. Thus, the power level signal 224 indicates to the stages which mode of operation should be used so that each stage provides either high-power/high-throughput or low-power/low-throughput.

Using the performance monitor control logic, the power consumption of individual pipeline stages may be reduced to meet the performance throughput of the lowest performing pipeline stage. For purposes of illustration, an example pseudocode is shown below which could be used by the Operating System or system supervisor to dynamically reconfigure power level signals provided to the individual pipeline stages using event thresholds to determine when the pipeline's throughput counts will allow the power levels to be changed without impairing the overall throughput of the pipeline. The pseudocode may be implemented as software, microcode or hardware logic circuitry. This pseudocode might be appropriate for an 8-cycle event count window with 4 possible events per clock cycle per stage.

```
#define HI_EVENT_THRESH 12
#define LO_EVENT_THRESH 16
#define PL_COUNT_THRESH 256
FH = (FetchEventCount >= HI_EVENT_THRESH);
DH = (DecodeEventCount >= HI_EVENT_THRESH);
EH = (ExecutionEventCount >= HI_EVENT_THRESH);
WH = (WritebackEventCount >= HI_EVENT_THRESH);
CH = (CompletionEventCount >= HI_EVENT_THRESH);
FL = (FetchEventCount == LO_EVENT_THRESH);
DL = (DecodeEventCount == LO_EVENT_THRESH);
EL = (ExecuteEventCount == LO_EVENT_THRESH);
WL = (WritebackEventCount == LO_EVENT_THRESH);
CL = (CompleteEventCount == LO_EVENT_THRESH);
if ((!FH && !DH && !EH && !WH && !CH && //few events
        PL)                  //high power
        || SYS_POWER) { //system power dissipation signal high
    PL = 0; //go to low power
    PL_COUNT = 0; //reset
} else if (!PL &&           //low power
        ((FL && DL && EL && WL && CL) || //all stages busy
        PL_COUNT >= PL_COUNT_THRESH)){
        //low pwr count high
    PL = 1; //go high power
} else PL_COUNT++; //count up to thresh
```

With this example code sequence, event threshold values are set to define when an individual stage in a high-power/high-performance mode is fully utilized (e.g., when the event count from a stage during a window exceeds the HI_EVENT_THRESH of 12), and to define when an individual stage in a low-power/low-performance mode is fully utilized (e.g., when the event count from a stage during a window equals the LO_EVENT_THRESH of 16). In addition, a timeout counter threshold value (PL_COUNT_THRESH) is set to define how many clock cycles a pipeline should be run in a low-power/low-performance mode before switching back to a high-power/high-performance mode, which gives the monitor the opportunity to determine if the pipeline can now have a higher overall throughput. The event counts from each pipeline stage (e.g., FetchEventCount, DecodeEventCount, ExecuteEventCount, WritebackEventCount, CompleteEventCount) are compared to the high-power event threshold values (HI_EVENT_THRESH), and the results of the comparisons are used to generate the power level (PL) logic bits which are used to control the pipeline execution. In the depicted code sequence, a pipeline that is operating in a high power mode (e.g., when PL=1) is switched to a low power mode (e.g., when PL=0) when all stages are not highly utilized (e.g., the event counts from the stages are below the high-power event threshold, HI_EVENT_THRESH). When the pipeline is switched to the low-power mode (!PL), a reset power level timeout counter (PL_COUNT) is incremented with each clock cycle, and the event counts from each pipeline stage are compared to the maximum low-power event threshold values (LO_EVENT_THRESH), which in one embodiment means that 2 events are being counted each cycle over an 8 cycle window. When this comparison indicates that the pipeline stages are being fully utilized in their low-power/low-performance mode and the power level timeout counter meets or exceeds the timeout counter threshold value (PL_COUNT_THRESH), the high power mode is chosen (PL=1). Also shown is use of the system power dissipation signal (SYS_POWER) which, when set to high (e.g., SYS_POWER=1) by system thermal sensors or other high power conditions, causes the power level signal to stay low (e.g., PL=0) which, in turn, reduces the system power and eventually causes the power dissipation signal to return to low (e.g., SYS_POWER=0).

Figure 4:
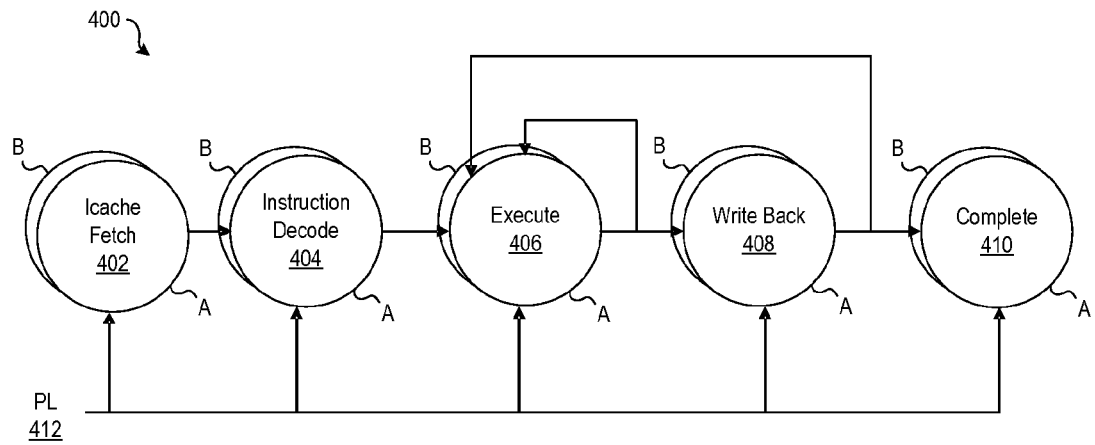
FIG. 4 illustrates in simplified schematic form a processor pipeline in which one or more power level signals feed the pipeline and control the function of the stages.

The application of the power level (PL) signal(s) to control the operation of the individual pipeline stages may be shown with reference to the example depicted in FIG. 4, which illustrates in simplified schematic form a processor pipeline 400 in which one or more power level signals 412 feed the pipeline stages 402, 404, 406, 408, 410 and control the function of the stages. In each stage, a first high-power, high-throughput mode may be implemented with a first circuit (as indicated with the "A" suffix), while a second low-power, low-throughput mode may be implemented with a second circuit (as indicated with the "B" suffix). If the performance monitor detects that the completion unit 410A is averaging 2 or fewer instructions completed per cycle, then a lower-power/low-throughput mode may be used for the stages since there is no reason to run the fetch, decode, write-back and issue units in high-power/high-throughput mode. To accomplish this, the performance monitor issues one or more power level signals 412 to instruct the completion stage and to the other stages to start executing in a reduced or low-power/low-throughput mode. In an example implementation where the power level signal 412 is a single signal that is sent to all the stages, a stage that receives a "low" power level signal 412 chooses a low-power mode or a low-power circuit to perform its function. Thus, if the fetch stage 402A receives a "low" power level signal 412, the fetch stage is reconfigured to use the low-power, low-throughput circuit 402B so that only 2 instructions are fetched per cycle rather than 4 instructions per cycle (as it would in a high-power/high-throughput mode). Likewise, a decode stage 404A that receives a "low" power level signal 412 may be reconfigured into a low-power, low-throughput mode wherein two low-power decoders 404B are used to decode only 2 instructions max per cycle. And when a "low" power level signal 412 is provided, the high-performance execution stage 406A is reconfigured as a low-performance execution stage 406B to schedule only two instructions per cycle or to execute in a low-frequency mode. In addition, the high-power write-back stage 408A is reconfigured as a low-performance write-back stage 408B to write back only two instructions per cycle. In this way, when the throughput of the completion stage 410 lowers the overall workload execution characteristics for the pipeline 400 to two instructions being completed per cycle, the other stages can be "down-shifted" to match the performance level of the completion unit 410 without degrading the overall pipeline performance.

As will be appreciated, the pipeline stages should not be left in the low-performance, low-power mode indefinitely, and a mechanism should be provided which allows the pipeline to return to the high-performance mode when it is evident that the workload could benefit from higher throughput, as occurs when the inherent instruction-level parallelism (ILP) of a workload increases in a phase of program execution. This may be accomplished by continuing to monitor the throughput counts from the stages as they operate in a low-power/low-throughput mode. When the performance monitor 220 (shown in FIG. 2) subsequently detects that the stages in the low-power/low-throughput mode are averaging at or close to the maximum utilization of instruction processing per cycle that is allowed in low-power/low-throughput mode, the pipeline stages may be reconfigured to return to the high-performance, high-power mode. To this end, the performance monitor 220 may issue one or more power level signals 224 to instruct all stages to switch to a high-power/high-throughput mode. Once returned to the high-power/high-throughput mode, the performance monitor 224 continues monitoring the throughput counts from each stage to determine if the workload characteristics have changed and more instructions can now be processed in parallel. As will be appreciated, the individual stages may be switched between modes at the same cycle or at different cycles, and may be separately controlled with individual power level signals 224.

In addition to reducing power consumption, the ability to selectively use lower-performance circuitry for individual stages can actually improve the workload performance for certain workloads, as compared to a pipeline stage that is designed only for maximal performance execution, which is sometimes referred to as the "greedy" approach to design. For example, a pipelined decode stage that is designed to decode four instructions in a single cycle may take more clock cycles than a decode of two instructions. In this case, the reduced latency decoder would be dynamically preferable to the longer latency (but higher throughput) decoder, when the workload only needs two instructions decoded per cycle. Examples of such workloads are those having a naturally low instruction-level parallelization (ILP), where the execution of processor pipeline in full power/high-throughput is not necessary and may negatively impact performance due to higher latencies in the units and cost power unnecessarily.

Figure 5:
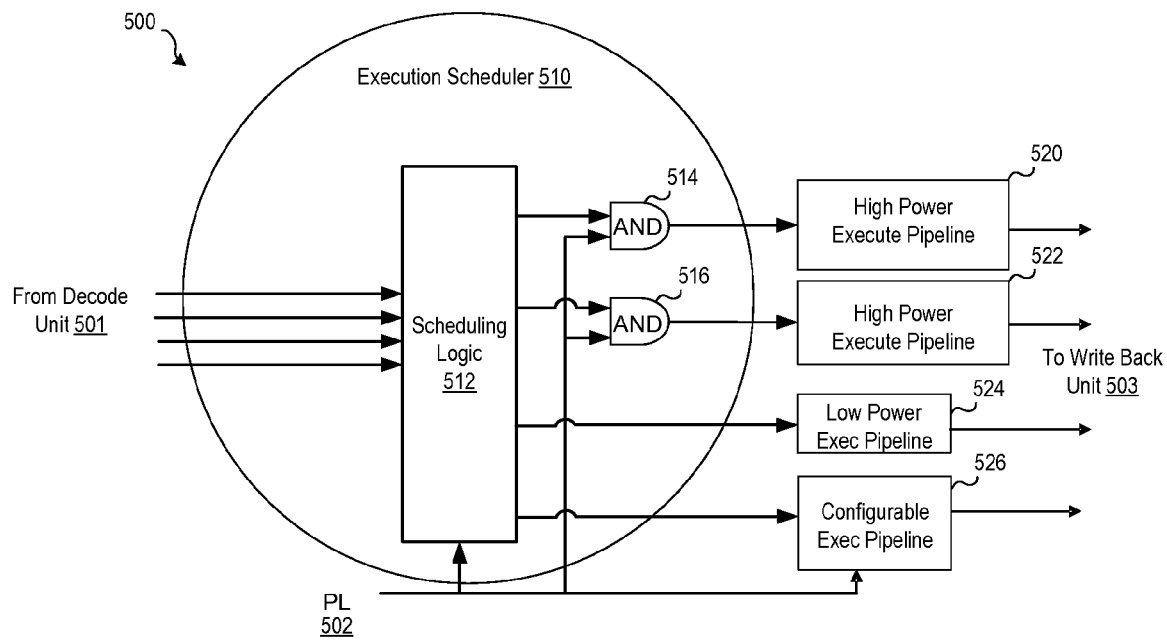
FIG. 5 illustrates an example implementation of an execution stage in which high performance designs and low performance designs may be separately selected in response to a power level signal.

To illustrate how a power level signal may be used to dynamically reconfigure an individual processor stage so as to switch between high-performance and low-performance modes, FIG. 5 illustrates an example implementation of an execution stage 500 in which high performance designs and low performance designs may be separately selected in response to a power level signal. As depicted, the execution stage 500 includes a plurality of separately selectable execution circuits, including a first high power execution pipeline circuit 520, a second high power execution pipeline circuit 522, a low power execution pipeline circuit 524 and a configurable execution pipeline circuit 526. High power execution pipelines 520 and 522 and configurable pipeline 526 may use additional circuitry or a frequency doubling to reduce latency of the instruction execution at the cost of significantly more power dissipation. As depicted, the execution scheduler 510 includes scheduling logic 512 and gating logic 514, 516 which receive decoded instructions 501 and selectively route the instructions for execution by the execution circuits 520, 522, 524, 526, depending on the value of the power level signal 502. Generally speaking, the power level signal determines whether the execution stage 500 uses the execution circuits to implement a high-performance mode (which results in a higher power dissipation) or a low-performance mode (which results in a lower power dissipation). As shown in the simple example implementation of FIG. 5, a single power level bit 502 that is set to "high" and that is applied to the gating logic 514, 516 effectively enables all of the execution circuits 520, 522, 524, 526 to be used by the execution stage 500 in a high-performance mode. However, when the power level bit 502 is set to "low," the gating logic 514, 516 effectively disables the first and second high power execution pipeline circuits 520, 522 so that the low power execution pipeline circuit 524 is used by the execution stage 500 in a low-performance mode. In addition to selectively enabling the high-power execution pipeline circuits 520, 522, the power level bit 502 may be used to separately configure a configurable execution unit 526. The power level bit 502 may also be incorporated in the scheduling logic 512 to limit the scheduled operations.

Of course, it will be appreciated that other approaches may be used to reduce the power consumption and performance at the individual pipeline stages without reducing the overall pipeline throughput beyond its current throughput rate. For example, individual pipeline stages may be throttled back by reducing the clocking rate for each stage. In addition or in the alternative, if an individual stage includes duplicate resources (e.g., two floating point units in an execution stage), the stage could be reconfigured into a lower-performance mode by using only one of the resources.

Figure 6:
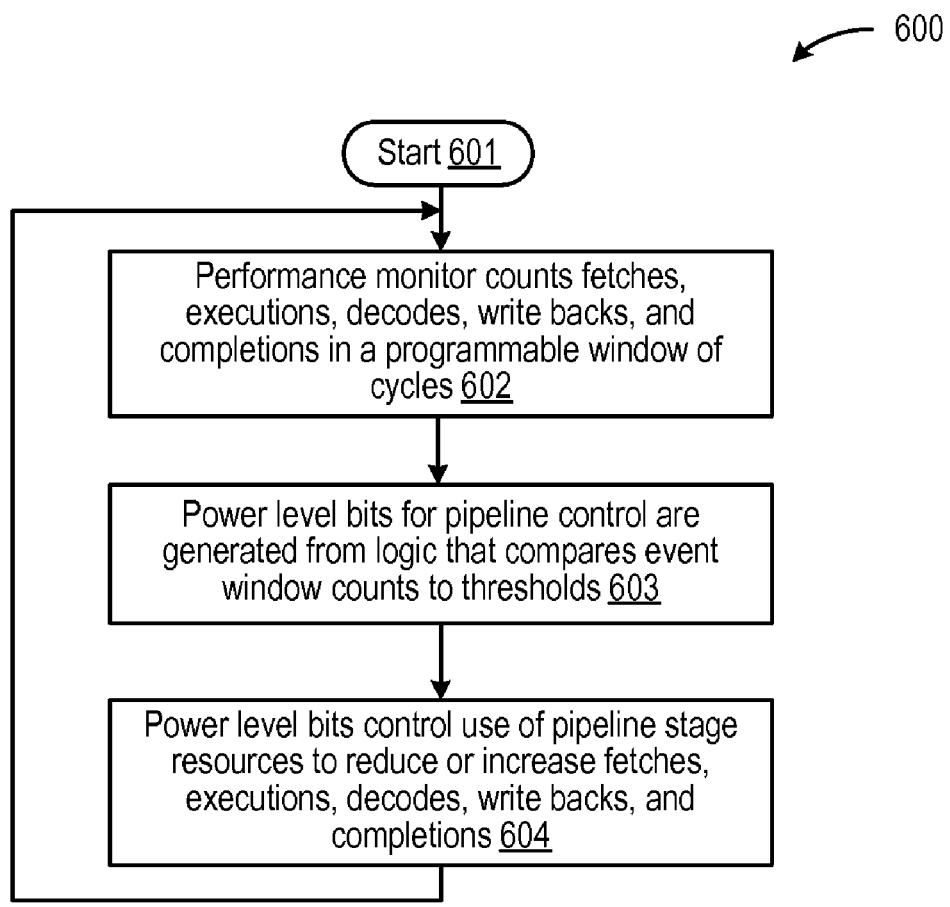
FIG. 6 shows a flow chart diagram of an example sequence for monitoring the performance of individual pipeline stages and generating one or more power level bits to control the pipeline stages.

To further illustrate selected embodiments of the present invention, FIG. 6 shows a flow chart diagram of an example methodology 600 for monitoring the performance of individual pipeline stages and generating one or more power level bits to control the pipeline stages. At step 601, the process starts, such as when a processor is operating with the pipeline configured in a high-performance, high-power mode. At step 602, the pipeline performance is monitored to detect when the pipeline throughput or performance drops. This may be done for each stage by counting or detecting how many stage events occur in a window of time, where the window may be fixed or programmably adjusted. Thus, the performance monitor counts the fetch events that occur at the fetch stage during the count window, and separately counts the decode events that occur at the decode stage during the count window, and so on. The result of step 602 is that a throughput count or event window count is measured for each pipeline stage. At step 603, the event window counts for each stage are compared to predetermined threshold values using control logic in the performance monitor. Based on the comparison, power level bits are generated for controlling the pipeline operation. The comparison may generate a "low" power level bit if an event window count from a single stage is below a first threshold value, or may require that event counts from all of the stages be below the first threshold value. Conversely, the comparison may generate a "high" power level bit the event window counts from all stages are at or above a second threshold value. At step 604, the power level bits are distributed or broadcast to the pipeline stages to control how the resources at each stage are used. When the power level bits indicate at step 604 that a lower-performance, lower-power mode is to be implemented, the pipeline stage resources are reconfigured to reduce the rate at which instructions are fetched, decoded, executed, written-back and completed. Conversely, if the power level bits indicate at step 604 that a higher-performance, high-power mode is to be implemented, the pipeline stage resources are reconfigured to increase the rate at which instructions are fetched, decoded, executed, written-back and completed. Thus, as the methodology 600 is repeated over time, the detected throughput counts are used to adjust the power level bits to either reduce or increase the pipeline performance (and attendant power consumption).

While the foregoing description has been provided with reference to an example implementation for controlling the power consumption of individual stages in a pipelined processor, it will be appreciated the techniques disclosed herein may be applied more broadly. For example, a multi-core processor system may be dynamically reconfigured from a first, high-performance mode (where all of the processor cores are operating) into a second, lower-power performance mode (where only selected processor cores are enabled and operative) based on the overall workload execution characteristics for the multi-core processor system. In another example, a general purpose processor core may be selected in a lower-performance mode to handle graphics processing requirements that would otherwise by handled by a faster, and more power hungry dedicated graphics accelerator circuit.

As will be appreciated by one skilled in the art, the present invention may be embodied in whole or in part as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a non-transitory computer-usable storage medium having computer-usable program code embodied in the medium. For example, each processor core in a multiprocessor system may have its own programming instructions or code for reconfiguring the pipeline performance to reduce power consumption based on detected pipeline throughput. Alternatively, the performance monitor control logic may be centrally located at a single location for the entire multiprocessor system.

The foregoing description has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification and example implementations provide a complete description of the manufacture and use of the composition of the invention. Since many embodiments of the invention can be made without departing from the spirit and scope of the invention, the invention resides in the claims hereinafter appended.

What is claimed is:

1. A method for controlling power dissipation in a pipelined processor, comprising:
    measuring a plurality of throughput rates for a corresponding plurality of pipeline stages operating in a high-performance mode;
    detecting when one or more of the plurality of throughput rates are reduced to a first predetermined throughput rate; and
    sending a first control signal to the plurality of pipeline stages upon detecting that the plurality of throughput rates are reduced to the first predetermined throughput rate; and
    reconfiguring the plurality of pipeline stages in response to the first control signal to operate in a low-performance mode, thereby reducing power dissipation by the plurality of pipeline stages.

2. The method of claim 1, further comprising:
    monitoring the plurality of throughput rates for the plurality of pipeline stages to detect when the plurality of throughput rates meets or exceeds a second predetermined threshold rate; and
    sending a second control signal to the plurality of pipeline stages upon detecting that the plurality of throughput rates meets or exceeds a second predetermined threshold rate; and
    reconfiguring the plurality of pipeline stages in response to the second control signal to operate in a high-performance mode.

3. The method of claim 1, where measuring a plurality of throughput rates comprises counting, for each pipeline stage, how many stage events occur during a predetermined window.

4. The method of claim 1, where detecting when one or more of the plurality of throughput rates are reduced to a first predetermined throughput rate comprises comparing one or more of the plurality of throughput rates to a predetermined high-performance throughput threshold value.

5. The method of claim 1, where sending a first control signal comprises broadcasting a one-bit control signal to the plurality of pipeline stages.

6. The method of claim 1, where sending a first control signal comprises sending separate control signals to each of the plurality of pipeline stages.

7. The method of claim 1, where sending a first control signal comprises sending a plurality of control signals to each stage to select a corresponding plurality of pipeline stage power dissipation modes, levels or circuitry.

8. The method of claim 1, where reconfiguring the plurality of pipeline stages comprises selecting, at each stage, a first low-power circuit in response to the first control signal.

9. A non-transitory computer-usable medium embodying computer program code, the computer program code comprising computer executable instructions configured for controlling power dissipation in a pipelined processor by:
   measuring a plurality of throughput rates for a corresponding plurality of pipeline stages operating in a high-performance mode;
   detecting when one or more of the plurality of throughput rates are reduced to a first predetermined throughput rate; and
   sending a first control signal to the plurality of pipeline stages upon detecting that the plurality of throughput rates are reduced to the first predetermined throughput rate; and
   reconfiguring the plurality of pipeline stages in response to the first control signal to operate in a low-performance mode, thereby reducing power dissipation by the plurality of pipeline stages.

10. The non-transitory computer-usable medium of claim 9, further comprising computer executable instructions configured for controlling power dissipation in a pipelined processor by:
    monitoring the plurality of throughput rates for the plurality of pipeline stages to detect when the plurality of throughput rates meets or exceeds a second predetermined threshold rate; and
    sending a second control signal to the plurality of pipeline stages upon detecting that the plurality of throughput rates meets or exceeds a second predetermined threshold rate; and
    reconfiguring the plurality of pipeline stages in response to the second control signal to operate in a high-performance mode.

11. The non-transitory computer-usable medium of claim 9, where the computer executable instructions are configured to measure the plurality of throughput rates by counting, for each pipeline stage, how many stage events occur during a predetermined window.

12. The non-transitory computer-usable medium of claim 11, wherein the predetermined window is programmable.

13. The non-transitory computer-usable medium of claim 9, where the computer executable instructions are configured to detect when one or more of the plurality of throughput rates are reduced to a first predetermined throughput rate by comparing one or more of the plurality of throughput rates to a predetermined high-performance throughput threshold value.

14. The non-transitory computer-usable medium of claim 9, where the computer executable instructions are configured to send the first control signal by broadcasting a one-bit control signal to the plurality of pipeline stages.

15. The non-transitory computer-usable medium of claim 9, where the computer executable instructions are configured to send the first control signal by sending separate control signals to each of the plurality of pipeline stages.

16. The non-transitory computer-usable medium of claim 9, where the computer executable instructions are configured to send the first control signal by sending a plurality of control signals to each stage to select a corresponding plurality of pipeline stage power dissipation modes, levels or circuitry.

17. The non-transitory computer-usable medium of claim 9, where the computer executable instructions are configured to reconfigure the plurality of pipeline stages by selecting, at each stage, a first low-power circuit in response to the first control signal.

18. A data processing system comprising:
    a processor comprising a plurality of circuit modules, where each circuit module performs a predetermined circuit operation and comprises a higher-power circuit for performing the predetermined circuit operation and a lower-power circuit for performing the predetermined circuit operation;
    a data bus coupled to the processor; and
    a computer-usable medium embodying computer program code, the computer-usable medium being coupled to the data bus, the computer program code comprising instructions executable by the processor and configured for controlling power dissipation in the processor by:
      measuring a plurality of throughput rates for a corresponding plurality of circuit modules, each of which is operating by using its higher-power circuit;
      detecting when one or more of the plurality of throughput rates are reduced to a first predetermined throughput rate; and
      sending a first control signal to the plurality of circuit modules upon detecting that the plurality of throughput rates are reduced to the first predetermined throughput rate; and
      reconfiguring the plurality of circuit modules in response to the first control signal so that each circuit module operates by using its lower-power circuit to match the first predetermined throughput rate.

19. The data processing system of claim 18, further comprising instructions configured for controlling power dissipation in the processor by:
    monitoring the plurality of throughput rates for the plurality of circuit modules to detect when the plurality of throughput rates meets or exceeds a second predetermined threshold rate; and
    sending a second control signal to the plurality of circuit modules upon detecting that the plurality of throughput rates meets or exceeds a second predetermined threshold rate; and
    reconfiguring the plurality of circuit modules in response to the second control signal so that each circuit module operates by using its higher-power circuit.

20. The data processing system of claim 18, where the plurality of circuit modules comprise a plurality of pipelined processor stages in a processor core.

* * * * *